No. 630,640. Patented Aug. 8, 1899.
L. W. YOUNG.
COMBINED HEDGE AND WIRE FENCE.
(Application filed Feb. 13, 1899.)
(No Model.)
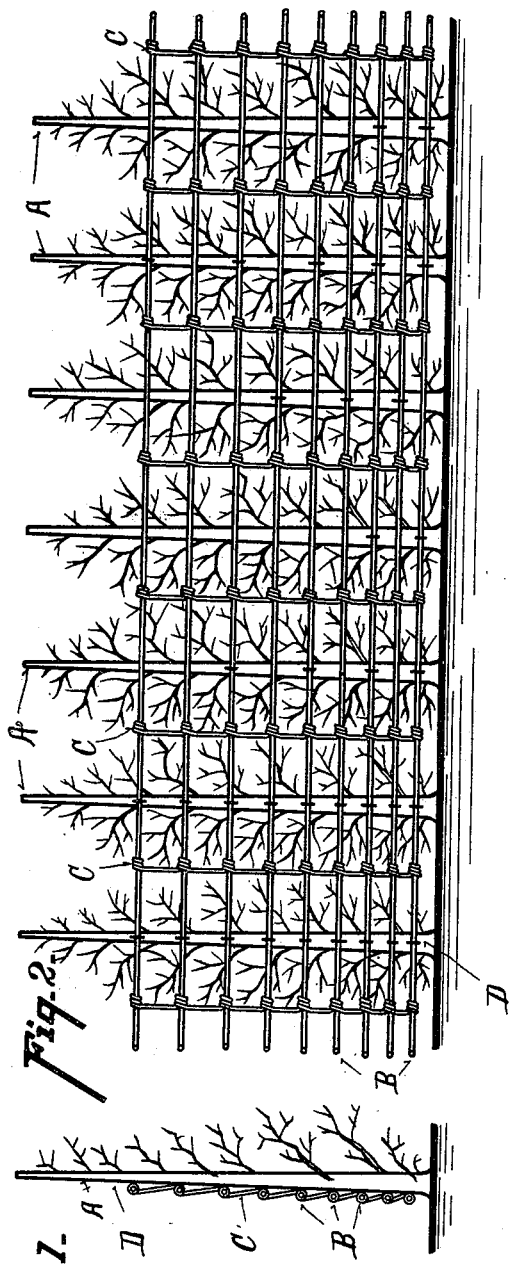
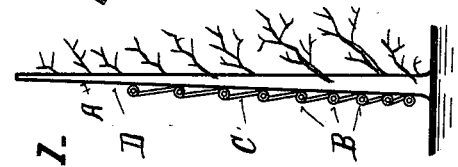
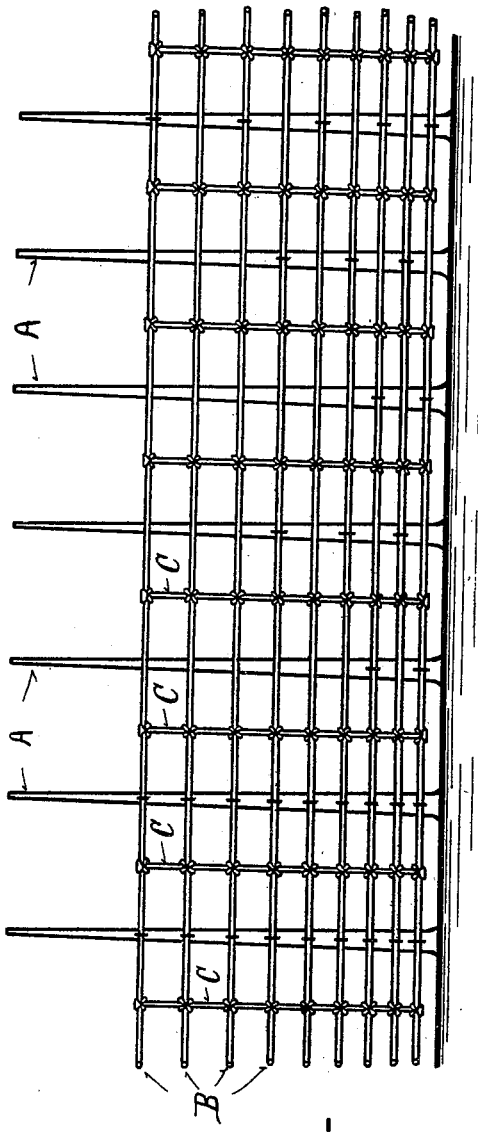
Witnesses
C. W. Miles
Oliver B. Kaiser
Inventor
Lorin W. Young
By Wm H Boyd
Attorneys
THE NORRIS PETERS CO., PHOTO-LITHO., WASHINGTON, D. C.

UNITED STATES PATENT OFFICE.

LORIN W. YOUNG, OF DAYTON, OHIO.

COMBINED HEDGE AND WIRE FENCE.

SPECIFICATION forming part of Letters Patent No. 630,640, dated August 8, 1899.

Application filed February 13, 1899. Serial No. 705,413. (No model.)

*To all whom it may concern:*

Be it known that I, LORIN W. YOUNG, residing at Dayton, in the county of Montgomery and State of Ohio, have invented certain new and useful Improvements in a Combined Hedge and Wire Fence, of which the following is a specification.

The object of my invention is to provide a combined hedge and wire fence of such character that the fence will be strong in construction, forming a complete ground-barrier, and which can be easily and cheaply constructed.

The features of my invention are more fully set forth in the description of the accompanying drawings, making a part of this specification, in which—

Figure 1 is a central vertical section of Fig. 2. Fig. 2 is a side elevation. Fig. 3 is a side elevation of the fence with the branches trimmed off of both sides.

A represents the row of hedge-plants.

B C represent lines of horizontal and vertical wires woven together to form what is known as "hog-wire." Of course they may be woven into a close web or loosely, as shown. The smaller the stock which it is desired to form a barrier for the closer should be the weave.

D represents the side of the fence upon which the limbs are trimmed off. The limbs may be trimmed off of one or both sides, as desired. They are trimmed off to a suitable height. The hog-wire is strained along the sides of the plants and stapled to the sides thereof. A tension device is preferably employed for this purpose, as it is desirable to have the wires secured under considerable tension. Preferably every other strand is secured to the plants by staples. The cross-wires C are left sufficiently open so as not to interfere with the growth of the fresh branches. When the branches grow out on the sides of the plants, they engage and entwine with the net-wire and form a practically impassable barrier, particularly designed for turning small animals or stock.

In the form shown in Fig. 2 the wires are stapled to the first few plants at each end very securely and only sparsely stapled along the intermediate portion of the hedge. This method is quicker, less expensive, and strong enough for all practical purposes, as the branches will engage the wires and in conjunction with the tension imparted to the wires in stapling will rigidly hold the same in position. Such a fence can be easily and quickly erected at a small expense and is very strong and durable, being effective for all purposes for which such fences are employed.

Having described my invention, I claim—

1. A combined hedge and wire fence composed of a line of hedge-plants trimmed of its branches to a suitable height, a strip of woven wire having rectangular meshes secured to one side of the hedge-plants by stapling the horizontal strands thereto under tension, the cross-wires forming vertical barriers between the plants along the hedge, substantially as specified.

2. A combined hedge and wire fence composed of a line of hedge-plants trimmed of its branches to a suitable height upon one side, and a strip of woven wire having horizontal and vertical strands secured to the trimmed side of the hedge-plants under tension by stapling the horizontal strands thereto, substantially as specified.

In testimony whereof I have hereunto set my hand.

LORIN W. YOUNG.

Witnesses:
WALTER V. SNYDER,
JOHN H. MEYER.